United States Patent [19]

Wick et al.

[11] 4,391,964

[45] Jul. 5, 1983

[54] EMBEDDING MASS OF POLYURETHANE

[75] Inventors: Gerhard Wick, Obernburg; Helmut Schulze, Wuppertal, both of Fed. Rep. of Germany

[73] Assignee: Akzo NV, Arnhem, Netherlands

[21] Appl. No.: 351,140

[22] Filed: Feb. 22, 1982

[30] Foreign Application Priority Data

Feb. 21, 1981 [DE] Fed. Rep. of Germany ....... 3106498

[51] Int. Cl.$^3$ ...................... C08L 91/00; C08G 18/75; C08G 18/77
[52] U.S. Cl. .................................... 528/74.5; 528/58; 528/73; 523/105; 523/112
[58] Field of Search ................ 528/74.5; 523/105, 112

[56] References Cited

U.S. PATENT DOCUMENTS

| | | | |
|---|---|---|---|
| 3,691,117 | 9/1972 | Messerly | 524/349 |
| 3,965,073 | 6/1976 | Olstowski et al. | 528/58 |
| 4,038,239 | 7/1977 | Coyner et al. | 524/872 |
| 4,038,304 | 7/1977 | Kazama et al. | 528/58 |
| 4,045,527 | 8/1977 | Babayam et al. | 528/58 |
| 4,344,873 | 8/1982 | Wick | 528/73 |

*Primary Examiner*—John Kight, III
*Assistant Examiner*—M. L. Moore
*Attorney, Agent, or Firm*—Michael J. Striker

[57] ABSTRACT

Embedding mass of polyurethane produced on the basis of castor oil, and a method for its production, wherein an aromatic diisocyanate is reacted with a mixture of castor oil and trimethylolpropane into an NCO-group displaying pre-adduct, the pre-adduct being mixed for network polymerization with castor oil or a mixture of castor oil and trimethylolpropane, and after embedding the mixture is hardened in the presence of catalyst, thereby characterized in that a titanium alkylate compound is used as catalyst in amounts from 7 to 700 ppm, calculated as elemental titanium. Preferably, the catalyst is a titanium tetraalkylate; in particular titanium tetrabutylate. Also, a titanium magnesium hexaalkylate may be used as titanium alkylate compound; preferably, titanium magnesium hexabutylate. Preferably the catalyst is present in amounts from 40 to 140 ppm, calculated as elemental titanium. The embedding mass may be used for the embedding of membranes, particularly in artificial organs, especially in the form of hollow filaments, tube foils or flat foils. They may be used for selectively working dialysators, including selectively working hemodialysators, and other arrangements for the detoxification of blood. The embedding is performed according to the casting process, preferably the centrifuge casting process.

21 Claims, No Drawings

EMBEDDING MASS OF POLYURETHANE

The invention concerns embedding masses based upon polyurethane produced with castor oil, methods for their production, as well as their use.

It is known from German Offenlegungsschrift DE-OS No. 28 13 197 to obtain such polyurethane by reacting an aromatic diisocyanate with a mixture of castor oil and trimethylolpropane into an NCO-group displaying pre-adduct, and network polymerizing the pre-adduct with castor oil or a mixture of castor oil and trimethylolpropane. The embedding mass described in this patent document is distinguished by outstanding characteristics such as high hardness, achromatism, tolerance with blood, and good working-up characteristics. They are particularly suitable for the embedding of membranes such as hollow filaments, tube foils, flat foils, and the like. These can be used for the construction of separating arrangements such as dialysators, in particular hemodialysators.

As is moreover mentioned in German Offenlegungsschrift DE-OS No. 28 55 243, embedding masses of polyurethane can be produced on the basis of castor oil, whereby as aromatic diisocyanate, 4,4'-diphenylmethanediisocyanate is used, which displays a content of 18 to 28 Mol-% dimerized and trimerized diisocyanate. This product is distinguished by good storage stability and viscosity characteristics, among others.

Finally, in German Offenlegungsschrift DE-OS No. 29 07 501 are described embedding masses on the basis of polyurethane produced with castor oil, methods for their production, as well as their use, whereby one uses an aromatic diisocyanate which contains 10 to 50 Mol-% 3-isocyanatomethyl-3,5,5-trimethylcyclohexylisocyanate. These polyurethane embedding masses are distinguished in particular through improved adhesiveness.

All of these embedding masses require however a long reaction period until hardening. Since there now exists a requirement for shorter working-up periods, whereby the time not only up to mold release of the embedding mass but also up to complete hardening is meant, attempts have been made to catalytically harden these polyurethanes. The resulting embedding masses contain then catalysts, which considerably impair or even make impossible the insertion therein of the membranes or the like.

The known effective catalyst groups for polyurethane hardening are tertiary amines, alkaline substances, and metallo-organic compounds. Amines often smell unpleasant, and influence in particular the re-splitting of the addition reaction. Alkaline substances likewise act to strongly accelerate the isocyanate-addition reaction. Disadvantages herewith are their low solubility in the initial components, and the formation of salts. Many metal salts act to accelerate, and almost all organometal compounds catalyze, the isocyanate reaction. Particularly effective are mainly compounds of heavy metals such as lead, mercury, tin, among others. With use of the catalyzed polyurethane for medicinal techniques, such heavy metal compounds are unsuitable on account of their toxicity, and accordingly should be avoided as much as possible.

Although a series of embedding masses based upon polyurethane is known, there persists yet a need for improved embedding masses and advantageous methods for their production, with which the above depicted disadvantages are not present.

SUMMARY OF THE INVENTION

It is therefore an object of the present invention to improve a method for the production of polyurethane embedding masses of the type depicted above, in particular through shorter working-up periods, which can be molded more economically and with better handleability, as well as to make available polyurethane embedding masses which are distinguished through good characteristics, and are versatile in their utility.

This object is attained according to the present invention by an embedding mass on the basis of polyurethanes produced from castor oil, composed of a polyurethane which is obtained through reaction of an aromatic diisocyanate with a mixture of castor oil and trimethylolpropane into a NCO-group displaying pre-adduct, and network polymerizing the pre-adduct with castor oil or a mixture of castor oil and trimethylolpropane in the presence of catalysts, thereby characterized in that the embedding mass contains 7 to 700 ppm, calculated as elemental titanium, of a titanium alkylate compound.

The titanium alkylate compound is preferably a titanium tetraalkylate, whereby titanium tetrabutylate is very suitable. Also titanium magnesium hexaalkylates, such as titanium magnesium hexabutylate, can be used. Preferably, the titanium compound is present in amounts from 40 to 140 ppm, calculated as elemental titanium.

For production of such embedding masses, there can serve a method of reacting an aromatic diisocyanate in stoichiometric excess with a mixture of castor oil and trimethylolpropane into an NCO-group displaying pre-adduct, mixing the pre-adduct for network polymerization, with castor oil or a mixture of castor oil and trimethylol propane, and hardening the mixture after the embedding in the presence of catalysts, which is thereby characterized in that one uses a titanium alkylate compound as catalyst, in amounts from 7 to 700 ppm, calculated as elemental titanium.

The hardening of the embedding mass can be performed very well at room temperature.

The embedding masses according to the present invention are in outstanding manner suitable for the embedding of membranes, in particular of membranes in artificial organs. Above all, they serve for the embedding of membranes in form of hollow filaments, tube foils or flat foils. Preferably, the embedding masses are used for the embedding of membranes in selectively acting dialysators, in particular in selectively working hemodialysators, as well as in other arrangements serving for the detoxification of blood.

The embedding masses according to the present invention are very suitable for embedding techniques which work according to the casting principle, above all according to the centrifuge casting methods.

The production of the polyurethane embedding masses according to the present invention takes place substantially according to the method described in German Offenlegungsschrift DE-OS No. 28 13 197, DE-OS No. 28 55 243 and DE-OS No. 29 07 501, whereby according to the present invention the further addition of catalysts occurs. The catalyst is mixed together with the castor oil or mixture of castor oil and trimethylolpropane serving for network polymerization.

Titanium alkylate compounds in amounts from 7 to 700 ppm are suitable as catalysts. Titanium tetraalkylates are well usable, preferably titanium tetrabutylate. Also very suitable are titanium tetraisopropylate, titanium tetrapropylate, titanium tetraisooctylate, titanium acetyl triisopropylate, titanium glycolate and titanium hexylene glycolate. As titanium alkylate compounds, there can also be used a complex titanium magnesium alkylate compound. Advantageously, titanium magnesium hexabutylate is used. Also suitable are titanium magnesium alkylate compounds of the formula Mg[HTi(OR)$_6$]$_2$.

It is particularly advantageous when the titanium compound is used in amounts from 40 to 140 ppm, calculated as elemental titanium.

It was particularly surprising that relatively small amounts of these completely non-toxic, medicinally non-hazardous catalysts work according to the present invention, that indeed at room temperature not only the production but also the working-up of the polyurethane embedding mass is possible advantageously and in favorable manner, and the working-up period can be reduced in more ideal manner compared to polyurethanes without the catalyst addition according to the present invention. This means that the embedding masses—depending upon the portion of catalyst—can be released from the mold within shorter periods, and also their final hardness value is reached considerably more quickly. The viscosity behavior during the embedding is so favorable that no difficulties arise.

The embedding masses according to the present invention have a clear appearance. In addition to the improvements which the production and the working-up ability of the embedding masses offer, the invention also brings advantages with regard to the characteristics of the embedding masses, e.g. the mechanical characteristics. A further advantage is that the embedding masses according to the present invention are attacked not at all or only in practically negligible manner, by customary liquids, which they come into contact with during use, so that no great danger exists, that undesirable substances become leached and get admitted into the dialysate or retentate.

The embedding masses according to the present invention are, however, suitable in outstanding manner as embedding masses for membranes, in particular for the embedding of membranes in artificial organs. They serve mainly for the embedding of membranes such as hollow filaments, tube foils or flat foils. In this manner, embedded membranes are advantageously used in selectively working dialysators, in particular in selectively working hemodialysators, as well as in other arrangements serving for the detoxification of blood.

It is moreover favorable that, in spite of the fact that the hardening period with the method according to the present invention is shorter than with an operation without addition of catalysts, a temperature increase occurs only in completely small measure, which is particularly advantageous with the embedding of delicate membranes. Accordingly, the embedding masses serve advantageously also for the embedding of temperature-sensitive membranes.

On account of the outstanding viscosity behavior during embedding, the embedding masses are also very suitable for embedding methods which work according to the casting principle, in particular according to the centrifuge casting method. The embedding masses spread very quickly around the membranes to be embedded, as a result of their outstanding viscosity behavior, filling up all spaces and allowing no cavities to arise. The wetting of the membranes with the embedding mass is excellent. An undesirable, too high rise of the embedding mass as a result of capillary force in the membranes does not occur. The embedding masses do not tend to the formation of bubbles.

The embedding masses are mixed very well at room temperature, and can then be polymerized at room temperature or higher temperatures, e.g. 50° C.

On account of the favorable temporary viscosity behavior of the masses during the network polymerization, the masses are mainly suitable also for the automatic embedding of membranes. Therewith also the mixing of the components can be performed in automatic machines very well at temperatures at which the network polymerization should occur, e.g. at 50° C.

The novel features which are considered characteristic for the invention are set forth in particular in the appended claims. The invention itself, however, both as to its construction and its method of operation, together with additional objects and advantages thereof, will be best understood from the following description of specific embodiments.

DESCRIPTION OF THE PREFERRED EMBODIMENTS

EXAMPLE 1

Production of the pre-adduct without catalyst.
Starting materials:

84.73 kg 4,4'-diphenylmethanediisocyanate with 25% by weight dimerized and trimerized diisocyanate (commercial product Isonate 143 L)

17.06 kg castor oil DAB 8

3.205 kg trimethylolpropane.

The liquid diisocyanate is filled into a reactor and heated to 65° C. under stirring and introduction of nitrogen.

In a second reactor are filled in successively the castor oil and the trimethylolpropane under stirring and introduction of nitrogen, and these are stirred for about 1 hour at 85° C. Then the heating is cut off, whereby the temperature is not allowed to sink below 60° C.

The content of the second reactor is then within 1 hour added to the liquid diisocyanate, pre-heated to 65° C., under stirring and introduction of nitrogen. Through cooling, the temperature during the reaction is held to about 70° C.

After the end of the addition of the trimethylol propane/castor oil mixture, the entire mixture is held for 2 hours at 70° C. The mixture should then possess an isocyanate content of 18.85% by weight (theoretically).

The prepared pre-adduct is then cooled to a temperature of 60° C., degassed to evacuation under slowed-down stirring, and emptied into a dry, with nitrogen flushed, container, by immersion filling, and is so directly suitable for the production of the embedding mass through polymerization.

EXAMPLE 2

Production of catalyst-containing polymerizer.
Starting materials:

75.33 kg castor oil DAB 8

0.67 kg trimethylolpropane 23.46 g titanium tetrabutylate

Castor oil and trimethylolpropane are filled into a reactor and stirred for about 1 hour at 80°–90° C. In the meantime, the catalyst is dissolved in a small remainder (0.33 kg) of castor oil under light heating at temperatures below 50° C., and under stirring, in a glass beaker, after which the entire solution is added.

After cooling the clear, well stirred mixture to a temperature below 50° C., it is degassed through evacuation under slowed-down stirring, and emptied by immersion filling into a dry container flushed with nitrogen.

The polymerizer is so directly usable for the network polymerization of the pre-adduct.

EXAMPLE 3

Embedding of hollow filament membranes.

25.8 g of the pre-adduct prepared according to Example 1, which possesses a temperature of 50° C., is mixed and then evacuated gas-free at 50° C. with 34 g of the polymerizer produced according to Example 2, which likewise has been kept at 50° C. This step takes 5 minutes. Then the mixture possesses a viscosity of about 3.8 Pa's. With 60 g of this mixture, a Cuprophan hollow filament bundle is embedded into a hemodialysator, according to the centrifuge method. (Cuprophan is a registered trademark of Enka AG, under which cellulose hollow filaments were obtainable on the filing date of this application, which have been produced according to the copper oxide ammonia method.) The centrifuge is operated at 500 rpm at room temperature. After 30 minutes, the dialysator is withdrawn from the centrifuge, and cut to the openings of the hollow filament ends. The hardened polyurethane cuts without difficulties. There is produced a smooth cut surface, without production of any cutting dust. The bond to the Cuprophan hollow filaments is excellent.

EXAMPLE 4

Production of the pre-adduct.

Starting substances:

64.63 kg 4,4'-diphenylmethanediisocyanate (Isonate 143 L)
15.22 kg Isophorondiisocyanate
16.96 kg castor oil DAB 8
3.19 kg trimethylolpropane Both diisocyanates are filled into a reactor and heated to 70° C. under stirring and introduction of nitrogen, until the reactor contents are present as a clear solution.

The further working-up follows in the same manner as described under Example 1. The prepared mixture has a theoretical isocyanate content of 19.67% by weight, which can fluctuate in practice about ±0.4% by weight.

The degassing and filling subsequently take place as described under Example 1.

EXAMPLE 5

Production of the catalyst-containing polymerizer.

Starting materials:
75.33 kg castor oil DAB 8
0.67 kg trimethylolpropane
102 g titanium magnesium hexabutylate The castor oil and the trimethylolpropane are filled into a reactor and stirred for about 1 hour at 80°–90° C. interior temperature. In the meantime, the catalyst is dissolved in a smaller remainder of castor oil (0.33 kg) under light heating at temperatures below 50° C. in a glass beaker, and then the entire solution is added.

After cooling the clear, well stirred mixture to temperatures below 50° C., it is degassed through evacuation under slowed-down stirring, and emptied by immersion filling into a dry container rinsed with nitrogen.

The polymerizer is so directly usable for the network polymerization of the pre-adduct.

EXAMPLE 6

Embedding of flat foils.

For the embedding of foils, 42 parts by weight of the pre-adduct according to Example 5 and 58 parts by weight of the polymerizer according to Example 2 are mixed together under intensive stirring at room temperature, within 2 minutes, and subsequently degassed through evacuation for 3 minutes.

The embedding takes place in known manner through injection of the reaction mixture into an appropriately prepared form, which contains 20 flat foils. The embedding mass is hardened at room temperature. After 40 minutes, removal from the mold is possible.

One can shorten the time to mold removal to 20 minutes, when the mixture is hardened at 50° C.

EXAMPLE 7

Automatic embedding of hollow filament bundles.

In an arrangement for the automatic embedding of hollow filament bundles, as described in the prospectus for the 600 H series Processing Systems For Urethane Elastomers of the firm Fluidyne Instrumentation, 1631 San Pablo Ave., Oakland, Calif. 94612, the pre-adduct and the polymerizer are provided.

Per unit time, 50 g of degassed polyurethane mixture, which is always composed of 21.5 g of the pre-adduct preheated to 50° C. and 28.5 g of the chain lengthener, likewise heated to 50° C., are expelled automatically for the casting of dialysator.

A removal from the mold is possible after about 20 minutes.

It will be understood that each of the elements described above, or two or more together, may also find a useful application in other types of embedding masses differing from the types described above.

While the invention has been illustrated and described as embodied in an embedding mass of polyurethane, it is not intended to be limited to the details shown, since various modifications and structural changes may be made without departing in any way from the spirit of the present invention.

Without further analysis, the foregoing will so fully reveal the gist of the present invetion that others can, by applying current knowledge, readily adapt it for various applications without omitting features that, from the standpoint of prior art, fairly constitute essential characteristics of the generic or specific aspects of this invention.

I claim:

1. Embedding mass of polyurethane produced on the basis of castor oil, composed of a polyurethane which has been obtained through reaction of an aromatic diisocyanate with a mixture of castor oil and trimethylolpropane into an NCO-group displaying pre-adduct and network polymerization of the pre-adduct with castor oil or a mixture of castor oil and trimethylolpropane, in the presence of catalyst, thereby characterized in that the embedding mass contains 7–700 ppm of a titanium alkylate compound, calculated as elemental titanium.

2. Embedding mass according to claim 1, wherein the embedding mass contains a titanium tetraalkylate as titanium alkylate compound.

3. Embedding mass according to claim 2, wherein the embedding mass contains titanium tetrabutylate as titanium tetraalkylate.

4. Embedding mass according to claim 1, wherein the embedding mass contains a titanium magnesium hexaalkylate as titanium alkylate compound.

5. Embedding mass according to claim 4, wherein the embedding mass contains titanium magnesium hexabutylate as titanium magnesium hexaalkylate.

6. Embedding mass according to claim 1, wherein the titanium compound is present in amounts from 40 to 140 ppm, calculated as elemental titanium.

7. Method for the production of an embedding mass of polyurethane comprising reacting an aromatic diisocyanate in stoichiometric excess with a mixture of castor oil and trimethylolpropane into an NCO-group displaying pre-adduct, mixing the pre-adduct for network polymerization with castor oil or a mixture of castor oil and trimethylolpropane, and hardening the mixture after embedding, in the presence of catalyst, thereby characterized in that a titanium alkylate compound is used as catalyst in amounts from 7 to 700 ppm, calculated as elemental titanium.

8. Method according to claim 7, wherein a titanium tetraalkylate is used as titanium alkylate compound.

9. Method according to claim 8, wherein titanium tetrabutylate is used as titanium tetraalkylate.

10. Method according to claim 7, wherein a titanium magnesium hexaalkylate is used as titanium alkylate compound.

11. Method according to claim 10, wherein titanium magnesium hexabutylate is used as titanium magnesium hexaalkylate.

12. Method according to claim 7, wherein the titanium compound is used in amounts from 40 to 140 ppm, calculated as elemental titanium.

13. Method according to claim 7, wherein the hardening of the embedding mass is performed at room temperature.

14. Use of the embedding mass according to claim 1, for the embedding of membranes.

15. Use of the embedding mass according to claim 14 for the embedding of membranes in artificial organs.

16. Use of the embedding mass according to claim 1, for the embedding of membranes in the form of hollow filaments, tube foils or flat foils.

17. Use of the embedding mass according to claim 1, in selectively working dialysators.

18. Use of the embedding mass according to claim 17, in selectively working hemodialysators.

19. Use of the embedding mass according to claim 1, for detoxification of blood.

20. Use of the embedding mass according to claim 1, for embedding of membranes according to the casting process.

21. Use of the embedding mass according to claim 20, for the embedding of membranes according to the centrifuge casting process.

* * * * *